Patented Aug. 23, 1932

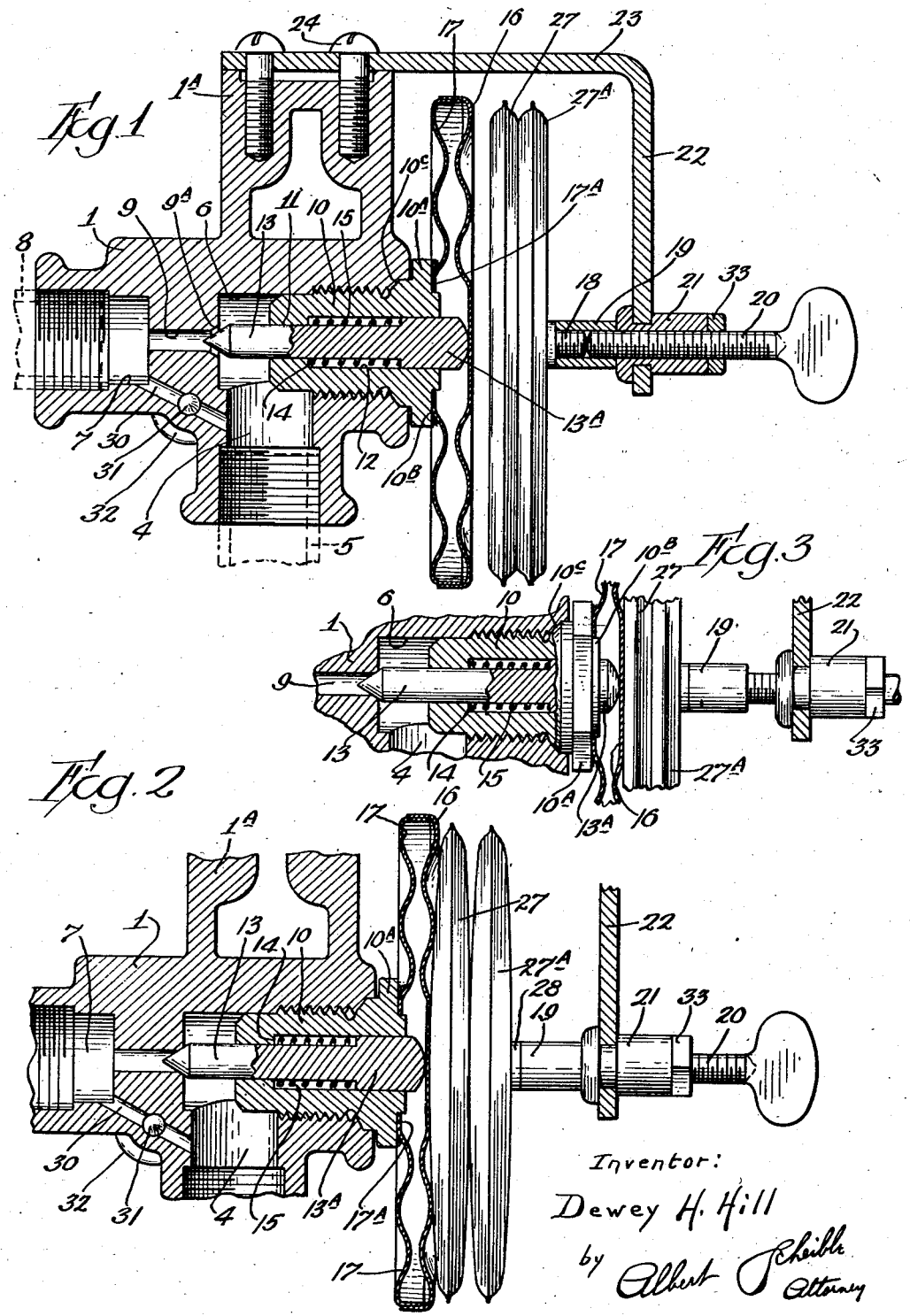

1,873,124

UNITED STATES PATENT OFFICE

DEWEY H. HILL, OF KOKOMO, INDIANA, ASSIGNOR TO GLOBE AMERICAN CORPORATION, OF KOKOMO, INDIANA, A CORPORATION OF INDIANA

THERMOSTATICALLY CONTROLLED FLUID VALVE

Application filed April 15, 1931. Serial No. 530,307.

My invention relates to thermally responsive valves for controlling the flow of fluid, and in its general aspects aims to provide a simple, cheaply manufactured and durable valve of this class which will be effectively sealed against a leakage of fluid, which will permit a convenient replacing of the thermostatic member of the valve, which can readily be attached as a unit to the piping for the fluid, which can also be operated manually when desired, and which can easily be disassembled for cleaning the valve.

In some more detailed aspects, my invention aims to provide a fluid mechanism in which a movable valve member is continually urged toward its valve-opening position and towards a thermally responsive member disposed outside the body member of the mechanism, in which a distortion of thermally responsive member beyond a minimum extent in response to an increase in temperature will operate through an interposed member for moving the movable valve member toward its closure position, and in which this interposed member also affords a seal to prevent the escape of fluid past the movable valve member.

Moreover, my invention provides a fluid-control mechanism of the just recited characteristics, including a manually movable auxiliary control member for bodily moving the thermally responsive member toward or away from the movable valve member, so as to permit a manual control of the fluid when the thermally responsive member is not sufficiently heated to shut off the fluid, and also to permit an adjustment of the extent to which the thermally responsive member will change in shape with an increase in temperature before it begins to move the movable valve member.

More particularly, my invention aims to provide a fluid-control mechanism of the above recited type in which an auxiliary hollow diaphragm serves as a sealed enclosure for receiving any fluid which leaks past the movable valve member, and also presents a wall through which the thrust of the thermally responsive member is transmitted to the movable valve member; and in which the same wall also acts as a stop for limiting the outward (or valve-opening) movement of the movable valve member.

In one of its important commercial applications, my invention is particularly suited for affording an automatic and thermally responsive control of the supply of gas to a gas burning appliance—as for example to a gas-heated brooder. In this aspect, my invention aims to provide a fluid controlling appliance of the aforesaid characteristics which will also provide a by-pass around the cooperating valve portions for continuously keeping the burner lighted, in which the movable valve member is a plunger slidable in a nipple, and in which the interposed member is supported by and sealed to this nipple and is detachable with the nipple from the valve body. Furthermore, my invention aims to provide simple means for supporting both the thermally responsive member and the manual control means from a valve body, and arms to arrange these parts for convenient detachment from the valve body.

Still further and also more detailed objects will appear from the following specification and from the accompanying drawing, in which drawing Fig. 1 is a central and vertical section taken through a gas brooder valve embodying my invention along the axis of the plunger which is the movable valve member of the device, showing the parts as they appear when the thermally responsive member is relatively cool and the valve is effectively open.

Fig. 2 is a similarly taken but fragmentary section, showing the parts when the thermally responsive member has been sufficiently changed in shape by a rise in its temperature to effect a closing of the valve.

Fig. 3 is a section similar to a portion of Fig. 1, with some parts shown in elevation, with the thermostatic member positioned closer to the valve body, and with the plunger in the position in which this plunger closes the inlet end of the outlet passage in the valve body.

In the illustrated embodiment, the valve body 1 is a casting having an inlet passage 4 leading from a gas-supply pipe 5 to a bore 6 which extends into the said body from one

member and hence coaxial with the plunger of the valve, and the outer end of the sleeve 19 abuts against the inner end of the bushing 21 and is clamped against that bushing by a locknut 33 which is also threaded on the screw shank 20, so that the thermostatic member is freely spaced (as in Fig. 1) from the resilient thrust-transmitting member, this being the disposition when the thermostatic member is below its responsive temperature.

When the temperature of the air adjacent to the thermostatic wafers exceeds that at which the ether in these wafers begins to vaporize, the vaporized ether gradually expands these wafers so as to bulge them apart along their axis, and since the twin wafers are supported only by the outwardly projecting stem 18, this bulging or axial expansion causes the inwardly directed face of the wafer 27 to approach the outer cup-bottom 16 of the resilient member. When the increase in temperature has produced this expansion of the wafers to the point where the most inward wafer face engages the said cup-bottom 16, a continued expansion of the wafers due to a further rise in temperature will flex the said outer face portion 16 of the resilient thrust-transmitting member toward the valve body, thereby sliding the plunger inwardly until the tapering tip of the plunger stem 13 engages the valve seat 9 A so as to shut off the flow of gas through the port 9. However, the burner is still kept lighted by the flow of a relatively smaller quantity of gas through a by-pass 30 controlled in the usual manner by a throttling screw 31 which has an exposed head 32 for turning it.

When the plunger has thus been moved either partially or all the way toward its closure position of Fig. 2, the heating effect of the burner is diminished, and the resulting reduction in the temperature of the thermostatic member gradually causes the vaporized ether to liquefy again. Consequently, the internal pressure within the twin thermostatic member is reduced, thereby permitting the spring 15 to slide the plunger outwardly, in doing which the plunger not only opens the flow of gas through the port 15 but also aids the outward wall 16 of the resilient thrust-transmitting member in returning to its normal position of Fig. 1, the stiffness of this member being such as to halt this outward wall in the position of Fig. 1 in which it is freely spaced from the thermostatic (or thermally responsive) member when the latter is below a temperature at which considerable of the ether in its wafers is vaporized.

Thus arranged, my simple mechanism automatically regulates the burner in response to the temperature around the thermostatic wafers. Moreover, by loosening a locknut 33 which is threaded on the stem of the thumb screw 20 and which normally engages the outer end of the sleeve 19, the user can turn this screw so as to move the sleeve 19 and the thermostatic wafers further toward the valve body, thereby varying the normal spacing of the inward wafer from the outer wall 16 of the resilient thrust-transmitting member and adjusting the mechanism for responding to a lower temperature. Indeed, when the locknut 33 has been loosened, the screw 20 can even be turned so far as to force the plunger to its seat manually (as in Fig. 3), thereby entirely shutting off the gas in case the valve body has no by-pass bore 30.

By removing the screws 24, the supporting bracket together with the parts carried by it can readily be detached, thereby permitting the thermostatic member to be replaced, and likewise permitting a detaching of the nipple and resilient diaphragm assembly for inspecting and cleaning the valve. This hollow diaphragm is easily brazed to the nipple before the latter is screwed into the valve body, so that my entire control mechanism is easily manufactured and inexpensive.

By using liquids volatile at other temperatures than sulphuric ether, my above described mechanism can readily be adapted for response at other temperature ranges, and its operation obviously will be similar regardless of the nature of the fluid passing through the valve. Hence I do not wish to be limited in the use of my invention. Nor do I wish to be limited to the details of the construction and arrangement above described, since many changes might be made without departing either from the spirit of my invention or from the appended claims.

I claim as my invention:

1. In a thermally controlled valve, a valve body provided with an inlet passage and, an outlet passage, and a port connecting the inlet passage with the outlet passage; a plunger controlling the inlet end of the said port; a tubular nipple threaded into the valve body and through which nipple the plunger slidably extends; a compression spring housed by the nipple and interposed between the plunger and an outwardly facing part of the nipple and continuously urging the plunger toward an outlet-opening position; a wafer-like and flexible sealing member having an aperture in its inward wall but otherwise imperforate, and having the part of its inward wall adjacent to the said aperture secured in sealing relation to the nipple; and a thermostatic member supported by the valve body outward of the sealing member and adapted when heated to press directly against the outward wall of the sealing member so as to force the plunger toward its port-inlet-closing position by thrust transmitted through the said outward wall of the sealing member; the said nipple, plunger, spring and sealing member being detachable as a unit from the valve body by unscrewing the nipple from the valve body.

2. In a thermally controlled valve, an assemblage of elements as per claim 1, in which the thermostatic member is freely spaced at low temperatures from the outward wall of the sealing member, including means associated with the thermostatic member for adjusting the extent of this free spacing.

3. A thermally controlled valve comprising a valve body provided with a longitudinal bore and with an inlet bore extending transversely of the longitudinal bore and opening into the longitudinal bore within the valve body, the longitudinal bore having a diametrically contracted bore portion opening at the juncture of the said bores to present a valve seat coaxial with the outer portion of the longitudinal bore; a tubular nipple threaded into the said outer bore and having the inward portion of the bore of the nipple of smaller diameter than the outward portion of the nipple bore; a plunger supported entirely by the nipple and including a stem extending slidably through the inward portion of the nipple bore, the tip of the stem being disposed for engaging the valve seat, the plunger also including a plunger head slidably fitting the outward portion of the nipple bore and projecting beyond the head of the nipple; an elastic wafer-like member coaxial with the said plunger and having an axial perforation in the inward wafer wall adjacent to the nipple, the said wafer wall being sealed and secured to the head of the nipple and the head of the plunger extending into the said member into engagement with the outward wafer wall; a spring interposed between the head of the plunger and an outwardly facing portion of the nipple for continuously urging the plunger outwardly; and a thermally responsive member supported by the valve body outward of the said elastic member and disposed for pressing the outward wafer wall towards the nipple in response to a rise in temperature; the nipple, plunger, spring and elastic member being detachable as a unit from the valve body when the nipple is unscrewed from the said body.

Signed at Kokomo, Indiana, April 9, 1931.

DEWEY H. HILL.